United States Patent

Fitchman et al.

[15] 3,640,775
[45] Feb. 8, 1972

[54] CELL TERMINAL

[72] Inventors: Arthur E. Fitchman, Yonkers; Raymond J. Nathe, Pleasantville, both of N.Y.

[73] Assignee: Marathon Manufacturing Company, Houston, Tex.

[22] Filed: Apr. 13, 1970

[21] Appl. No.: 27,948

[52] U.S. Cl...........................................136/134, 136/135
[51] Int. Cl. .....................................................H01m 5/00
[58] Field of Search..................136/134, 135, 179, 180, 181; 204/267, 279

[56] References Cited

UNITED STATES PATENTS

| | | | |
|---|---|---|---|
| 885,562 | 4/1908 | Alt | 136/134 |
| 1,250,460 | 12/1917 | Holland | 136/134 |
| 3,179,538 | 4/1965 | Dalin | 136/134 |

*Primary Examiner*—Donald L. Walton
*Attorney*—J. Vincent Martin, Joe E. Edwards and Jack R. Springgate

[57] ABSTRACT

A battery core pole connector and brace for a pair of battery cores in which a comb connects like electrodes of each of the core. The connector is a U-shaped strap interconnecting like poles of two cores, rigidly bracing the cores with respect to each other. Each connector has extensions which brace the opposite sidewalls of the battery casing and space and secure the cores in place. The main run of each connector may also brace the adjacent wall on each side. The connector carries a terminal which may extend outside the casing. The connector resists rotative and other stresses which may be applied to the exterior terminals and prevents the transmission of such stresses to the cores.

9 Claims, 5 Drawing Figures

PATENTED FEB 8 1972 3,640,775
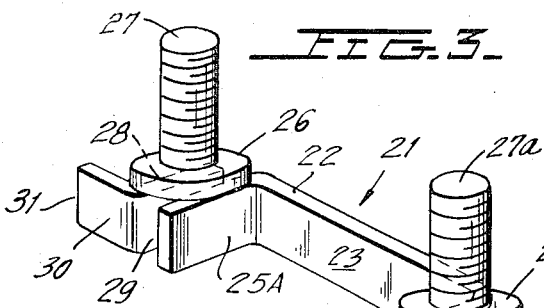
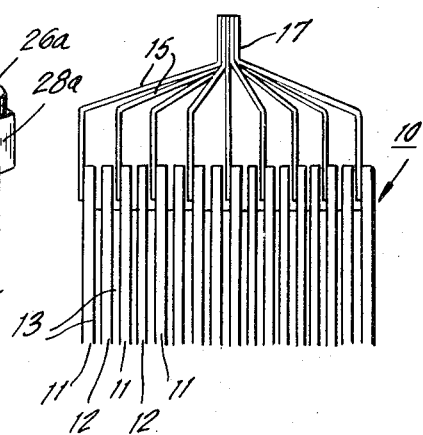
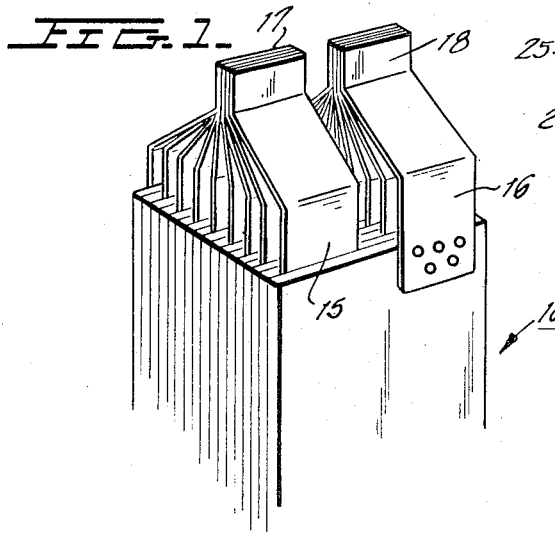
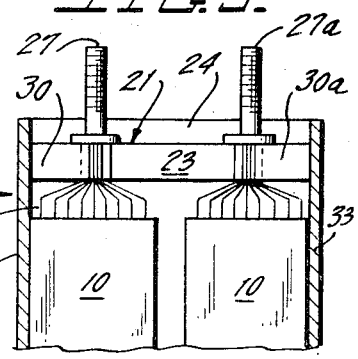
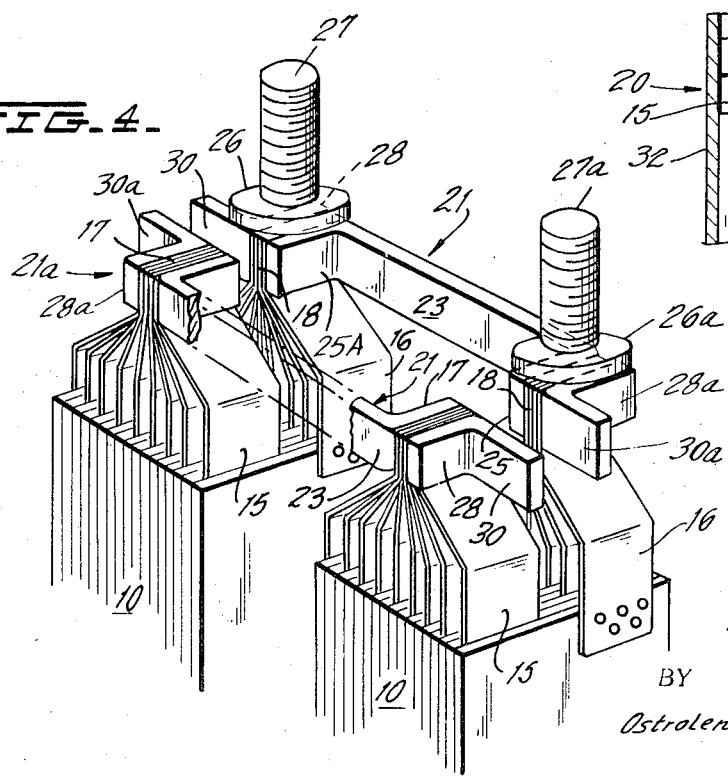
INVENTORS
ARTHUR E. FITCHMAN
RAYMOND J. NATHE
BY
Ostrolenk, Faber, Gerb & Soffen
ATTORNEYS

CELL TERMINAL

This invention relates to batteries and more particularly to alkaline batteries in which a battery core is formed of a plurality of alternating positive and negative plates in close laminar proximity to each other with spacing elements therebetween which will permit the electrolyte to maintain intimate contact with the plate surfaces and which will permit free flow of ions while, however, maintaining the proper spacing between electrode elements of opposite polarity.

Batteries of this type often have a plurality of cores in a single casing which must be maintained in proper geometric relation to each other and must be properly located within the casing. Since such battery cores frequently comprise electrodes which are thin sintered plates ranging in thickness from less than 1 to about 2 mm., mechanical strains on the plates may result from normal use of the battery must, therefore, be minimized or avoided. When a plurality of cores is thus inserted in a single casing the terminal structure is subjected to stresses especially when they are placed in circuit and when removed therefrom. These strains on the terminal structure may shift the cores and impinge forces on electrodes which may damage them.

This invention is, therefore, primarily directed to a novel terminal structure for a pair of cores in a battery wherein the terminal structures serve also to space and support the cores in the battery casing, to support and reinforce the wall of the battery casing and also to resist the transmission of mechanical stresses on the terminals to the battery cores.

In the structure of a core consisting of positive and negative electrodes the leads from each electrode of the same polarity in the core are brought together into a single connector unit or subterminal and combined in any suitable manner as for instance by welding. Since these leads are usually flat the subterminal becomes a flat blocklike element to which another terminal element can be connected. The combination of leads from the electrodes in a core having the same polarity is generally referred to as a comb. Each core, therefore, is provided with a pair of such combs one for the negative and one for the positive plates.

This invention contemplates a structure wherein at least two of the cores are placed side by side in a casing with the subterminal structure of the comb for each pole parallel to and on the same side. A strap is placed across the subterminal elements of the same polarity of the two cores, the strap has terminal connectors secured thereto, these terminal connectors being arranged to extend outside of the casing. The strap is so shaped that it extends along the wall of the casing reinforcing that wall and also has extension elements bearing against the adjacent sidewalls thereby rigidifying the casing and placing a structural member in position to take all of the stresses that may arise from the making and breaking of connections without causing these stresses to be transmitted to the battery core.

The primary object of this invention, therefore, is the provision of a terminal strap structure for a plurality of cores in a battery wherein the terminal strap may interconnect connector elements of like polarity of the plurality of cores and at the same time reinforce and strengthen the core structure while also reinforcing and rigidifying the battery casing.

The foregoing and many other objects of this invention will become apparent in the following description and drawings in which:

FIG. 1 is a view in perspective showing a battery core structure with a pair of combs secured thereto each interconnecting plates of like polarity.

FIG. 2 is an end view of the core showing the manner in which the comb interconnects alternate plates of the battery core.

FIG. 3 is a view in perspective showing the novel terminal structure.

FIG. 4 is a view in perspective showing the novel terminal structure in place on the subterminals of the battery cores.

FIG. 5 is a view partly in section showing the manner in which the novel terminal structure spaces the cores and provides a bearing against opposite sides of the battery casing.

Referring first to FIGS. 1 and 2, the battery core 10 comprises a plurality of plates 11, 12 of opposite polarity and alternating with each other. These plates are spaced from each other in order to prevent shorting of the plates but may also be provided with separators 13, 13 which are of such nature that they may permit the electrolyte to be in intimate contact with the plates 11, 12 and permit the free flow of ions.

Each of the plates 11 is provided with a flat lead 15 secured thereto in any suitable manner as by welding or other appropriate connection. Each of the leads 15 is brought together with the others and secured together to form the subterminal 17 which is formed by welding or otherwise securing the end of the leads 15 into a single block 17. Similarly, each of the plated 12 is provided with a lead 16; the plurality of leads form the subterminal block 18. The subterminal blocks 17 and 18 are, therefore, of opposite polarity.

The leads 15 and 16 are made of a thin highly conductive material and are, of course, much thinner than the separators 13 so that their slight extension, if any, from the side of the plate will not serve to short the plate to the adjacent plate. In addition, each plate may when originally formed be provided either with a recess into which the lead can be secured or with a conductive tab to which the lead can be secured so that the effective thickness of the plate is not increased by the securement of the lead thereto.

When a pair of cores 10, 10 is placed in a battery casing 20 (see FIGS. 4 and 5) the terminal connector 21 (FIG. 3) may be placed over the subterminal block 17 and 18 and secured thereto in any suitable manner as by being tightly squeezed thereon or cold welded or welded. In FIG. 4 two such terminal straps 21 and 21A are shown, the strap 21 connecting the terminal blocks or subterminals 18 of like polarity of the two cores 10 and the strap 21 connecting the two subterminals 17.

The strap 21 comprises an essentially U-shaped member 22 having a run 23 which may extend in contact with wall 24 of the casing 20; and a pair of extensions 25, 25A each of which forms one element of a connector. The U-shaped member 22 is secured at each end by welding or in any other suitable manner to a terminal support 26, 26A which may as shown be circular but may have any other shape consistent with the securement thereto, at the upper surface thereof, of the exterior terminal extension 27, 27A. Legs 25, 25A of the U-shaped strap support members are secured to the under surface of supports 26, 26A. Supports 26 and 26A each carry a contact plate 28, 28A which together with the respective legs 25, 25A of U-shaped member 22 form a recess 29, 29A each of which will receive one of the subterminal blocks 18 or 17. The elements 25–28A and 25A–29 may when they are mounted on the pair of subterminal blocks, for instance subterminal 18—18, are squeezed together mechanically to form a good contact with the subterminal block 18 or may be cold welded thereto or welded thereto.

Each of the members 28 and 28A is also provided with an extension 30, 30A. The extensions 30 and 30A extend in the same plane which plane is substantially parallel to the plane of run 23 of the U-shaped structure 22. The outer edges 31 and 31A of extensions 30 and 30A bear against the sidewalls 32, 33 of the casing 20.

The terminal strap member 21, therefore, serves by reason of the rigid element 23 thereof to space the two cores effectively from each other and to prevent movement of the cores with respect to each other. The combination of the two terminal straps 21, 21A as shown in FIG. 4 provides a rigid interconnection between the two cores which prevents any shifting or skewing of the cores with respect to each other. When the core assembly integrated by the strap 21, 21A is inserted in the casing 20 the bearing of the edges 31, 31A of extensions 30 and 30A of the terminal strap structure against the sidewalls 32, 33 further rigidifies the core structure while at the same time serving to strengthen the casing 20. If desired also, the run 23 of strap 21 may bear against the associated wall 24 of the casing; the two straps on each side thus serve to strengthen the casing as well.

The terminal elements 27 and 27A, which are shown here as screw-threaded elements above the top wall of the casing to provide for interconnection of the battery with other batteries or in a circuit. Where desired, only one of such terminal elements may be provided for each strap since, as shown, the two terminals, 27 and 27A of each strap are of the same polarity. When such battery is in use connectors are placed on the terminal elements 27 or 27A or both, and at a corresponding terminal element of a strap of the opposite polarity. The normal mechanical stresses entailed in connecting the terminal 27 in circuit and especially disconnecting the said terminal elements may cause a rotation of the terminal with respect to the battery casing and, therefore, a rotation of the elements inside the casing to which it is connected. The novel strap interconnection as herein described prevents such rotative forces from being communicative to the elements in the battery casing by preventing rotation of the terminal and by preventing skewing of the elements. The interconnecting battery core structures thereby brace each other and are braced by the casing.

In the foregoing the invention has been described in connection only with a preferred illustrative embodiment thereof. Since many variations and modifications of the invention will now be obvious to those skilled in the art, we prefer to be bound not by the specific disclosures herein contained but only by the appended claims.

We claim:

1. In a battery having a casing and at least a pair of cores, each core having a plurality of electrodes, each of the electrodes having a conductive lead, leads from electrodes of the same polarity being gathered together into a common first subterminal block and leads of electrodes of opposite polarity being gathered together into a second subterminal block, said battery having a casing, said first and second subterminal blocks being adjacent opposite walls of the casing, said cores being arranged in said casing with the first subterminal blocks of the same polarity of each core being adjacent one wall of said casing and the second subterminal blocks of opposite polarity being adjacent an opposite wall of said casing:

The invention which comprises an interconnector for at least a pair of subterminals of like polarity;

said interconnector comprising at least a pair of members, each of which is electrically secured to one of said subterminal blocks, said interconnector having additional extensions on each side engaging laterally adjacent walls of the casing;

said interconnector comprising a rigid member spacing said terminal blocks and spacing said cores with respect to the walls of the casing.

2. The interconnector of claim 1 wherein the said interconnector is also provided with terminals which may extend outside the casing.

3. The interconnector of claim 1 wherein the main body of interconnector extends in abutment with the adjacent wall of the casing.

4. The interconnector of claim 2 wherein the interconnector has an extended U-shaped section, with the base of the U extending parallel to the adjacent wall of the casing and each leg of the U forming part of said member which is connected to a subterminal block.

5. The interconnector of claim 4 in which the base of the U is in contact with the said adjacent wall.

6. The interconnector of claim 4 wherein a terminal support is secured on each leg of said U-shaped section; and additional member substantially parallel to the first-mentioned member is secured to said support substantially parallel to the first-mentioned member, the two said members receiving and being securable to a subterminal block 7. The interconnector of claim 6 wherein each additional member is provided with a leg extending in a plane substantially parallel to the base of the U, an end of each leg abutting a sidewall of the said casing.

8. The interconnector of claim 6 wherein an exterior terminal is mounted on at least one of said terminal supports.

9. The battery of claim 1 wherein a pair of interconnectors is placed on opposite sides of said cores and spaces said cores with respect to each other nd the walls of the casing.

* * * * *